3,079,392
TRIAZOLO(4-3,b)PYRIDAZINES
Marcel Pesson, 5 Rue Armand Carrel, Paris, France
No Drawing. Filed Apr. 27, 1961, Ser. No. 105,907
4 Claims. (Cl. 260—250)

This invention relates to new compositions of matter comprising amine derivatives of triazolo-4-3,b pyridazine, and to the preparation thereof. The new compositions have various valuable uses. They are useful in pharmacy and medicine because of their cardio-vascular and related activities. They also are valuable in photography and in the dye industries.

This application is a continuation-in-part of my copending application Serial No. 740,999 filed June 10, 1958. and now abandoned.

In the ensuing disclosure and claims the following nomenclature is used to designate the following compounds:

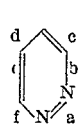 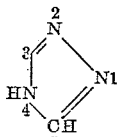 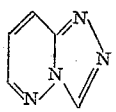

Pyridazine     Triazole     Triazole 4-3,b pyridazine

It is known, cf. Ber. 43, 1979 (1910) to react ethyl acetoacetate with amino-4-triazole-1,2,4 to produce oxymethyl-6-triazolo 4-3,b pyridazine by the reaction

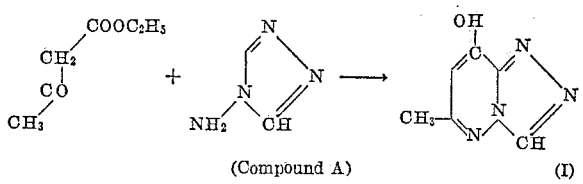

(Compound A)     (I)

It is also known from the same publication to prepare the chlorinated derivative in position 8, i.e.

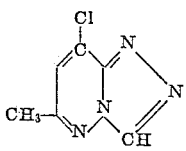

by simultaneously reacting compound A defined above with a mixture comprising phosphor pentachloride and phosphor oxychloride at reflux for about one hour.

The present invention provides a process for preparing the amine derivatives of triazolo 4-3,b pyridazine, which comprises reacting amino-4-triazole 1-2-4 with a beta-ketonic acid having the general formula

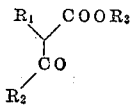

wherein $R_1$ and $R_2$ may be similar or different, each representing a hydrogen atom or a lower alkyl radical, and both of which may form part of a common cycle, and wherein $R_3$ represents an alcoyl radical, to produce a compound of the formula

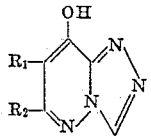

This compound is subjected to a chlorinating step and the resulting chlorinated derivative is then in turn subjected to a substitution reaction with one or more compounds of the formula

wherein $R_4$ and $R_5$ each represent a hydrogen atom or a lower alkyl radical and may form part of a common cycle.

The first step of the process involves a reaction similar to reaction (1) indicated above. The second step involving chlorination of derivatives of the general formula

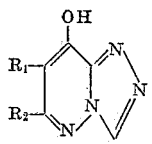

is effected with phosphorus oxychloride as the chlorinating agent.

According to a feature of the invention, the phosphorus oxychloride is used alone and, according to another feature, excess phosphorus oxychloride is destroyed after completion of the reaction by adding a lower alkanol such as methanol or ethanol.

The third step of the process involving substituting of the chlorine derivative obtained in the second step is carried out by means of the aforesaid compounds having the general formula

where this compound is ammonia, the reaction is preferably conducted in an organic solvent medium at a temperature range of from 100 to 130° C.

Where the compound just noted is a primary or secondary amine, the reaction is conducted in an aqueous solvent or an organic solvent such as alcohol or aromatic hydrocarbons.

If the amine used has a boiling point higher than 100° C., the reaction may be conducted without the use of a solvent and in the presence of an excess of the amine great enough to fix the hydrochloric acid generated in the reaction.

If the compound used is hydrazine, the operation may be conducted in an aqueous medium at ordinary temperature.

This invention further includes the new compounds of the formula

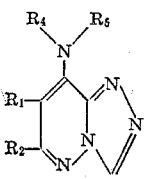

wherein $R_1$, $R_2$, $R_4$ and $R_5$ may be similar or different and each represent a hydrogen atom or a lower alkyl radical having no more than five carbon atoms and $R_1$ and $R_2$ as $R_4$ and $R_5$ may form part of a common cycle.

There is provided by this invention a new process for producing, on an industrial scale, an entire new class of amino derivatives of triazolo 4-3,b-pyridazine, having varied valuable uses especially in the fields of medicine, photography and coloring materials.

Some examples will now be given of the manner in which the process of the invention can be practically performed in its various steps or stages.

EXAMPLE 1

*Chloro-8-Methyl-6-Triazolo 4-3,b Pyridazine*

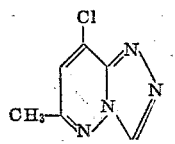

40 grams of oxy-8-methyl-6-triazolo 4-3,b pyridazine suspended in 200 grams phosphor oxychloride are heated at reflux. The starting mixture enters into solution after about 1 hour heating. Boiling is maintained for about one hour after complete dissolution. The resulting brown solution is concentrated until dry in vacuo (bath temperature 100° C.). The viscous mass is cooled and 100 cc. alcohol are gently added to it. A violent reaction ensues. On return to quiescence the mixture is carried to reflux for one hour in a water bath. During this heating the viscous initial mass crystallizes to yield a fine powder. After cooling the mixture is allowed to stand some hours in an icebox. The precipitate is drained dry and is recrystallized in the minimum amount of water required, which is about 90 cc. The crystals are drained dry, washed with water then with a dilute solution of sodium bicarbonate to remove any free acids, then recrystallized again in water.

Yellowish-white crystals are obtained, melting point 185° C.

EXAMPLE 2

*Amino-8-Methyl-6-Triazolo 4-3,b Pyridazine*

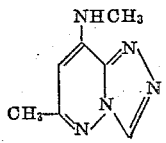

5 grams of chloro-8-methyl-6-triazolo 4-3,b pyridazine and 30 cc. of a saturated ammonia solution in methanol are heated 8 hours at 130° C. in an autoclave.

After cooling the solvent is removed in vacuo and the residuum is twice recrystallized in water. M.P. 214° C. The formula is $C_6H_7N_5$ (149.22).

Calculated: C=48.29, H=4.72, N=47.10. Observed: C=48.88, H=4.88, N=46.87.

EXAMPLE 3

*Methylamino-8-Methyl-6-Triazolo 4-3,b Pyridazine*

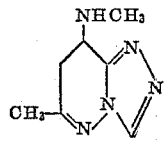

28 grams chloro-8-methyl-6-triazolo 4-3,b pyridazine are dissolved by reflux heating with 180 cc. water. On complete dissolution of the halogen derivative heating is arrested and 150 cc. of a 30% aqueous solution of methylamine are added by means of a bromine ampula. After this addition has been completed the solution is heated so as to boil gently during 1 hour 30 minutes. During this heating, part of the reaction product begins to crystallize out. The crystallization allowed to proceed to completion by allowing the solution to stand overnight in an ice-box. The crystals are drained dry, washed with iced water and recrystallized from water.

White crystals, M.P. 230° C. are obtained with a reaction yield of 20 grams, formula is $C_7H_9N_5$ (163.2).

Calculated: C=51.51, H=5.55, N=42.91. Observed: C=51.11, H=5.77, N=42.71.

EXAMPLE 4

*Ethylamino-8-Methyl-6-Triazolo 4-3,b Pyridazine*

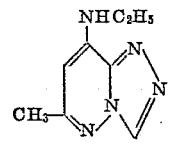

4 grams chloro-8-methyl-6-triazolo 4-3,b pyridazine and 100 cc. water containing 4 g. ethylamine are heated 8 hrs. under reflux. On cooling the solution is allowed to stand overnight in the ice-box. The crystalline precipitate is drained dry and recrystallized in water.

White crystals are obtained, melting at 204° C. Formula is $C_8H_{11}N_5$ (177.2).

Calculated: C=54.22, H=6.25, N=39.52. Observed: C=54.59, H=6.46, N=39.26.

EXAMPLE 5

*Dimethylamino-8-Methyl-6-Triazolo 4-3,b Pyridazine*

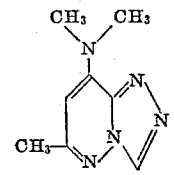

M.P.=155° C.

$C_8H_{11}N_5$ (177.2), calculated: C=54.22, H=6.25, N=39.52. Observed: C=54.36, H=6.23, N=39.59.

EXAMPLE 6

*Isopropylamino-8-Methyl-6-Triazolo 4-3,b Pyridazine*

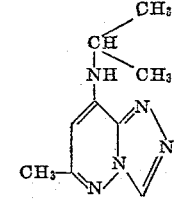

M.P. 168° C.

$C_9H_{13}N_5$ (191.23), calculated: C=56.53, H=6.85, N=36.63. Observed: C=56.77, H=7.08, N=36.65.

EXAMPLE 7

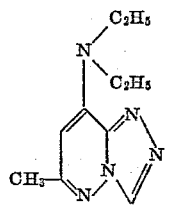

4 grams chloro-8-methyl-6-triazolo 4-3,b pyridazine and 10 g. of a 50% alcohol solution of diethylamine are heated 8 hrs. in an autoclave at 120° C. After cooling the solvent and excess diethylamine are eliminated in vacuo at 100° C. The residuum is exhausted with ethyl acetate to separate the heterocyclic base from the diethylamine hydrochlorate. After filtering the ethyl acetate is removed in vacuo and the residue is recrystallized in cyclohexane. Yellowish white crystals are obtained, melting at 99° C.

EXAMPLE 8

*N Piperidine-8-Methyl-6-Triazolo 4-3,b Pyridazine*

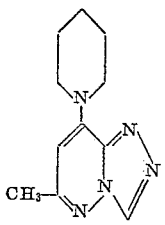

5 grams chloro-8-methyl-6-triazolo 4-3,b pyridazine and 7.5 grams piperidine are mixed together in a flask. The flask is immersed one hour in an oil bath at 160° C. On cooling the contents is agitated with 50 cc. boiling water. An oil appears which crystallizes on cooling. The crystals are drained, recrystallized once out of water and again out of ethyl acetate.

The resulting yellowish crystals melt at 118–119° C.

$C_{17}H_{15}N_5$ (217.27), calculated: C=60.80, H=6.98, N=32.23. Observed: C=61.27, H=7.14, N=32.77.

EXAMPLE 9

*Butylamino-8-Methyl-6-Triazolo 4-3,b Pyridazine*

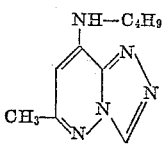

Melting point 148° C.

$C_{10}H_{15}N_5$ (205.26), calculated: C=58.52, H=7.36, N=34.13. Observed: C=58.47, H=7.24, N=34.12.

EXAMPLE 10

*Trimethylene 6-7 Oxy-8-Triazolo (4-3,b) Pyridazine*

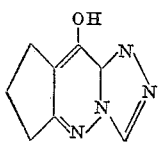

45.6 grams amino 4 triazolo 1-2-4 and 100 grams ethyl cyclopentanone carboxylate are heated 8 hours at 150° C. in a flask provided with upflow cooling means. The flask is then fitted with a downflow cooling system and heated 3 hours at 280°. After cooling the contents of the flask is taken up at boiling point with a 10% soda solution. The solution is treated with carbon black, filtered, acidified, and the precipitate is drained and recrystallized in water. The melting point is 260° C.

$C_8H_8ON_4$ (176.1), calculated: N=31.81. Observed: N=31.73.

EXAMPLE 11

*Trimethylene 6-7 Chloro-8-Triazolo 4-3,b Pyridazine*

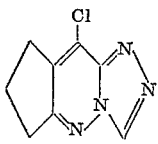

16 grams trimethylene 6-7 oxy-8-triazolo 4-3,b pyridazine and 200 cc. phosphor oxychloride are heated 2 hours at reflux. The oxy-triazolopyrisazine passes wholly into solution within the first hour of heating. The major part of the phosphor oxychloride is eliminated in vacuo, and then 50 cc. ethanol are added gently to destroy any remaining traces of phosphor oxychloride, and the mixture is heated 1 hour at reflux. On standing in an icebox the reaction product crystallizes out of the solution. The crystals are drained, washed with iced water, and recrystallized once out of water, and once again out of alcohol.

The white crystals melt at 185–186°.

$C_8H_7N_4Cl$ (194.62), calculated: C=49.37, H=3.62, N=28.79. Observed: C=49.16, H=3.55, N=28.47.

EXAMPLE 12

*Trimethylene 6-7 Methylamino-8-Triazolo 4-3,b Pyridazine*

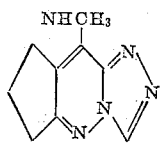

2.8 grams of the chlorinated derivative obtained in the preceding example and 50 cc. of a 15% methylamine solution in water are heated 2 hours at reflux. The chlorinated derivative gradually dissolves. On cooling the solution is placed overnight in an ice-box. The resulting crystals are drained, washed with ice water and recrystallized from water. White crystals are obtained, melting point 222–224° C.

$C_9H_{11}N_5$, calculated: C=57.13, H=5.86, N=37.01. Observed: C=57.25, H=5.76, N=37.10.

The various amine derivatives of triazolo 4-3,b pyridazine obtained by the methods of the invention have been investigated for their pharmacodynamical properties.

A particular one of the novel group of compounds, methylamino-8-methyl-6-triazolo 4-3,b pyridazine will be more particularly described herein and the properties of other compounds will be referred thereto. The chief characteristics of this compound may be summarized as follows:

(1) Hypotensor activity, connected with vaso-dilation of the vessels in the limbs and skin was demonstrated both by perfusion and plethysmographic methods. The coronary system is also involved in this effect and this has been evidenced by variations in the blood flow rate in an isolated and perfused heart of rabbit and guinea-pig. Active doses resulting in a notable reduction (from 15 to 20 mm. mercury) of arterial pressure in the dog and guinea-pig as registered by a mercury manometer are on the order of 0.25 to 0.50 mg. per kilogram animal weight when applied intravenously.

Blood pressure reducing effects are likewise observed in the rat and guinea-pig not under anaesthesia after oral application of doses from 20 to 50 mg. per kilogram body weight. The variations in arterial pressure were recorded by oscillographic methods ("Physio-Control" recording oscillograph).

(2) Toni-cardiac activity is chiefly characterized by an increase in amplitude of myocardic contractions (positive inotropic action) and a slight acceleration of heart rhythm (positive chronotropic action). The tonicardiac properties were evidenced both in the whole test animal with the heart in situ and in isolated preparations, involving perfused heart of guinea-pig and rabbit, isolated auricle of guinea-pig and rat. Concentrations that are active in the case of an isolated auricle, which amount to $0.5 \times 10^{-5}$ or less, are readily applicable to an organism as a whole and correspond to doses in the range from 0.3 to 0.4 mg. per kilogram live body weight.

(3) Antitoxic action against certain poisons of the myocardium: barium chloride, magnesium chloride, amino-4-diethylamino-4' propylamino diphenyl sulfone dichlorohydrate, said 2489 P. The novel compound is effective in preventing and removing arhythmia and auriculo-ventricular block as caused by such poisons. This action was evidenced on the whole animal by electrocardiographic methods.

(4) Spasmolytic activity is clearly evidenced on the smooth intestinal fibre. It was demonstrated on isolated preparations, including ileum of guinea-pig and duodenum of rat, and was also demonstrated in situ on the intestine of a dog and rabbit by the "ballonnet" method.

The acute toxicity characteristics of the novel compound were determined by the following procedures.

(a) *Intravenous injection (mice)*. Acute intravenous toxicity was investigated in mice of average weight 20 grams in doses of 10, 20, 30, 35, 40, 50 and 60 mg. per kilogram. Ten test animals were used for each of the doses indicated. The compound was dissolved in distilled water and concentrations were so calculated that the volume of liquid to be injected was 0.25 cc. per 10 grams animal weight in every case. The injection was completed in not less than one minute. The batches of animals were checked over an 8-day-period. The mortality curve was established by the probit method and indicates a 50% lethal dose (LD 50) of 40 mg./kg.

The sex of the test animals was found to be immaterial.

Mice were found to be more sensitive to the compound than the other animals tested including guinea-pigs, rabbits and dogs.

(b) *Hypodermic injection (mice)*. The doses used were 50, 60, 65, 80, 100, 112.5 and 125 mg. per kilogram weight each applied to a batch of 10 animals. The same solution concentrations were used as indicated in the preceding paragraph. The 50% lethal dose was found to be 65 mg./kg.

(c) *Oral application (mice)*. Solutions were applied by oesophagian probe. The doses used were 50, 60, 75 and 100 mg. per kg. weight, at variable concentrations so predetermined that the volume administered was 0.25 cc. per 10 grams of body weight. Batches of 10 animals were used for each dose. The 50% lethal dose was 54 mg./kg.

The activities of a number of other amine derivatives of triazolo (4-3,b) pyridazine as compared to the derivative discussed in detail above, are summarized in the appended table. Similar tests were conducted in the case of each substance as those just described for methylamino-8-methyl-6-triazolo (4-3,b) pyridazine, and comparative activity coefficients are indicated in the table for each property, using unity to indicate the corresponding property in methylamino-8-methyl-6-triazolo (4-3,b) pyridazine.

|  | Hypotensor activity | Tonicardiac activity | Toxicity ratio | | Respiratory analeptic activity |
|---|---|---|---|---|---|
|  |  |  | S.C. | I.V. |  |
| Methylamino-8-methyl-6-triazolo (4-3,b) pyridazine | 1 | 1 | 1 | 1 | 0 |
| Amino-8- | 0.05 | 0 |  |  | ++ |
| Ethylamino-8- | 0.75 | 0.75 |  |  | 0 |
| Diethylamino-8-: |  |  |  |  |  |
| Guinea-Pig | 10 | 0.5 | 0.86 | 0.54 | ++ |
| Dog | 0.1 |  |  |  |  |
| Isopropylamino-8- | 0.5 | 0.5 |  |  | + |
| Diethylamino-8- | 0.05 | 0.5 |  |  | 0 |
| N-piperidino-8- | 0.5 | 0.25 |  |  | 0 |
| N-butylamino-8- | 0.5 | 0.5 |  |  | 0 |
| Trimethylene 6-7 methylamino-8- | 4 | 1 | 0.32 | 0.47 | ++ |

I.V. Intravenous.
S.C. Sub-cutaneous.

What I claim is:

1. A compound selected from the group consisting of

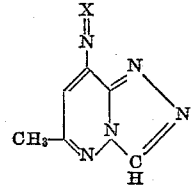

and

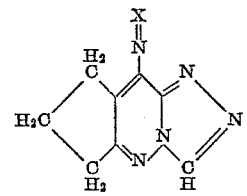

wherein the unit —N=X is a member of the group consisting of mono-lower alkylamino, di-lower alkylamino and piperidino wherein said lower alkyl has a maximum carbon content of five carbon atoms.

2. 6-methyl-8-methylamino triazolo 4-3,b pyridazine.

3. 6-7 trimethylene-8-methylamino-triazolo-4,3,b pyridazine.

4. 6-methyl-8-piperidino-triazolo-4,3-b-pyridazine.

References Cited in the file of this patent

Bulow et al.: Berichte, volume 43 (1910), pages 1979–84.

Takahayshi: Chem. Abstr., volume 51 (1957), column 1192d.

Takahayshi: Chem. Abstr., volume 52 (1958), column 6359.